(12) United States Patent
Reiman et al.

(10) Patent No.: US 7,942,466 B2
(45) Date of Patent: May 17, 2011

(54) VEHICLE SIDE FAIRING SYSTEM

(75) Inventors: James Reiman, Winnetka, IL (US); Peter Heppel, Port-Louis (FR); Kenneth Gilbert, Shelby Township, MI (US)

(73) Assignee: Aerofficient LLC, Winnetka, IL (US)

( * ) Notice: Subject to any disclaimer, the term of this patent is extended or adjusted under 35 U.S.C. 154(b) by 90 days.

(21) Appl. No.: 12/369,566

(22) Filed: Feb. 11, 2009

(65) Prior Publication Data

US 2009/0212596 A1 Aug. 27, 2009

Related U.S. Application Data

(60) Provisional application No. 61/030,428, filed on Feb. 21, 2008.

(51) Int. Cl.
*B62D 35/00* (2006.01)
(52) U.S. Cl. .................................................. 296/180.4
(58) Field of Classification Search ..... 296/180.1–180.5
See application file for complete search history.

(56) References Cited

U.S. PATENT DOCUMENTS

| | | | |
|---|---|---|---|
| 2,101,793 A | 12/1937 | Field, Jr. | |
| 2,605,119 A * | 7/1952 | Earnest | 280/849 |
| 3,574,300 A | 4/1971 | Moore | |
| 3,711,146 A | 1/1973 | Madzsar et al. | |
| 3,834,752 A | 9/1974 | Cook et al. | |
| 4,036,519 A | 7/1977 | Servais et al. | |
| 4,142,755 A | 3/1979 | Keedy | |
| 4,156,543 A | 5/1979 | Taylor et al. | |
| 4,311,334 A | 1/1982 | Jenkins | |
| 4,518,188 A | 5/1985 | Witten | |
| 4,553,782 A | 11/1985 | Markland | |
| 4,611,847 A | 9/1986 | Sullivan | |
| 4,682,808 A | 7/1987 | Bilanin | |
| 4,688,841 A | 8/1987 | Moore | |
| 4,693,506 A | 9/1987 | Massengill | |
| 4,702,509 A | 10/1987 | Elliott, Sr. | |
| 4,746,160 A * | 5/1988 | Wiesemeyer | 296/180.2 |
| 4,779,915 A | 10/1988 | Straight | |
| 4,824,165 A | 4/1989 | Fry | |
| 4,904,015 A | 2/1990 | Haines | |
| 5,078,448 A | 1/1992 | Selzer et al. | |
| 5,092,648 A | 3/1992 | Spears | |
| 5,280,990 A * | 1/1994 | Rinard | 296/180.1 |
| 5,595,419 A | 1/1997 | Spears | |
| 5,658,038 A | 8/1997 | Griffin | |
| 5,921,617 A * | 7/1999 | Loewen et al. | 296/180.4 |
| 6,428,084 B1 | 8/2002 | Liss | |
| 6,644,720 B2 * | 11/2003 | Long et al. | 296/180.4 |
| 6,799,791 B2 | 10/2004 | Reiman | |
| 6,986,544 B2 | 1/2006 | Wood | |
| 7,008,005 B1 | 3/2006 | Graham | |
| 7,374,229 B1 * | 5/2008 | Noll et al. | 296/180.2 |
| 7,404,592 B2 | 7/2008 | Reiman | |
| 7,604,284 B2 | 10/2009 | Reiman | |
| 7,748,772 B2 * | 7/2010 | Boivin et al. | 296/180.4 |
| 2003/0057736 A1 * | 3/2003 | Long et al. | 296/180.4 |
| 2004/0239146 A1 | 12/2004 | Ortega et al. | |

(Continued)

*Primary Examiner* — H Gutman
(74) *Attorney, Agent, or Firm* — Fitzpatrick, Cella, Harper & Scinto

(57) ABSTRACT

A vehicle side fairing having a first fairing panel fixedly secured to the underside of a trailer box, and a second fairing panel slidably mounted to the first fairing panel. The second fairing panel is releasably secured to the wheel set so that the second fairing panel can be moved with an adjustment in the position of the wheel set.

1 Claim, 7 Drawing Sheets

U.S. PATENT DOCUMENTS

| | | |
|---|---|---|
| 2006/0152038 A1 | 7/2006 | Graham |
| 2007/0182207 A1* | 8/2007 | Nakaya ...................... 296/180.1 |
| 2008/0238139 A1* | 10/2008 | Cardolle ................... 296/180.4 |
| 2008/0315622 A1* | 12/2008 | Oda ........................... 296/180.1 |
| 2009/0212595 A1* | 8/2009 | Heppel et al. .............. 296/180.4 |

* cited by examiner

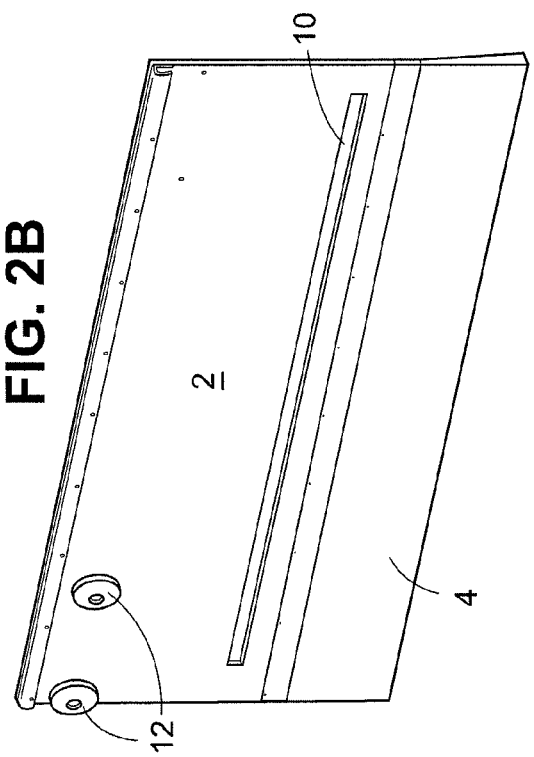
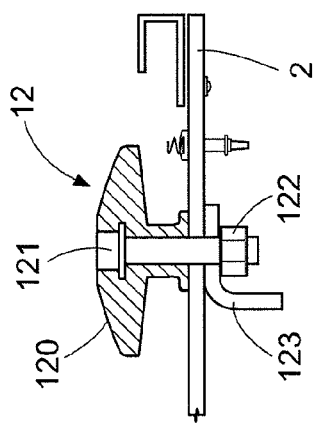
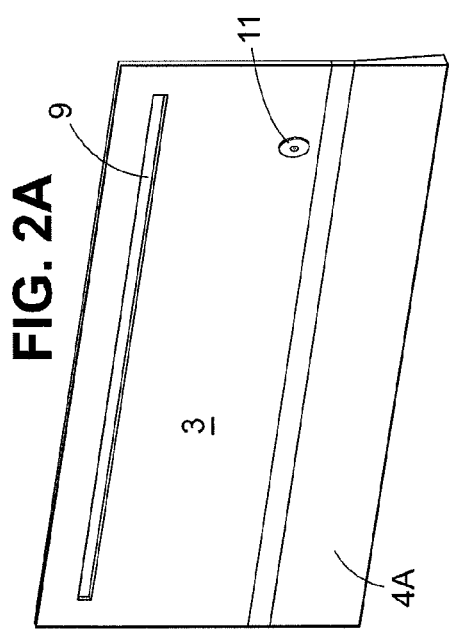
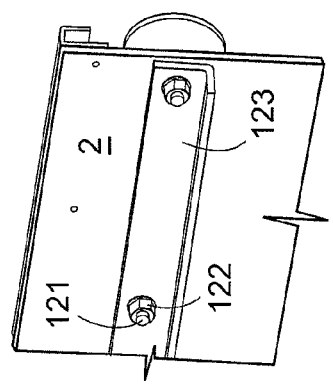
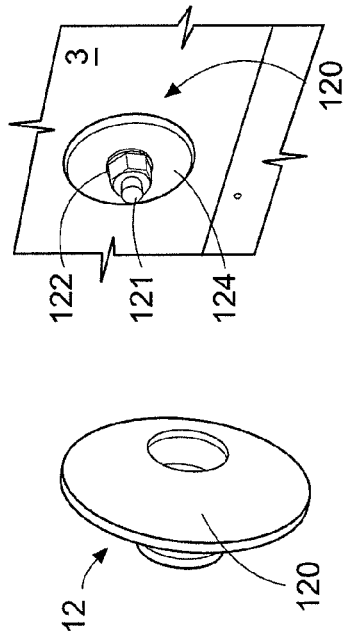

VEHICLE SIDE FAIRING SYSTEM

This application claims the benefit of U.S. Provisional Application No. 61/030,428, filed Feb. 21, 2008, the contents of which are incorporated by reference herein.

BACKGROUND OF THE INVENTION

1. Field of the Invention

This invention relates to a system for improving the aerodynamic profile of vehicles by utilizing side vehicle fairing structures, especially for use on a tractor-trailer truck ("Truck"). The system improves fuel consumption without having a material adverse impact on a Truck's operation or service procedures.

2. Description of Related Art

The amount of power needed to move a vehicle over land or through the air increases with the speed of the vehicle due to aerodynamic drag. The amount of power necessary to overcome aerodynamic drag directly translates into increased fuel consumption, and thus increased emission of greenhouse gases and pollutants, and increased cost of operation.

A variety of innovations aimed at reducing the aerodynamic drag of various transport vehicles, including tractor-trailer combinations, have been introduced in the prior art. These include efforts to make the hood, windscreen, fenders, etc. more streamlined in form, as well as by adding fairings to the cab roof, and in some cases, to the trailer box.

U.S. Pat. No. 6,799,791 discloses a vehicle fairing structure that may be deployed on the rear of a trailer box to reduce drag at the rear end of the trailer box. Since a significant amount of drag is also associated with the front of the trailer box, where there is known to be an area of high pressure and relatively stagnant air approximately at the middle of the forward vertical face of the trailer cab, a front fairing structure for reducing this drag is disclosed in U.S. patent application Ser. No. 11/684,097, filed Mar. 9, 2007, now U.S. Pat. No. 7,604,284. A system that includes side fairings to further reduce drag is disclosed in U.S. patent application Ser. No. 11/684,104, also filed Mar. 9, 2007 now U.S. Pat. No. 7,404,592. The foregoing patent and applications (U.S. Pat. No. 6,799,791, and U.S. patent application Ser. Nos. 11/684,097 and 11/684,104) are incorporated herein by reference.

The invention disclosed herein is to further optimize the design of the vehicle side fairing, and to incorporate features that take into account the real-world nature of Truck operation.

SUMMARY OF THE INVENTION

The present invention functions to smooth the flow of air across the sides of a Truck's van-box trailer ("Trailer") by reducing air flow disruptions and resultant aerodynamic drag (i) between the rear tires of a Truck's tractor and the wheels of the Trailer, (ii) under the Trailer and (iii) in and around the Trailer's wheel assembly ("Bogies"). This is accomplished by closing, or at least reducing, the "gap" between (i) the rear wheels of a Truck's tractor and the Trailer's wheels, and (ii) the bottom of the Trailer and the ground. The present invention is a device to fill, or at least reduce in effect, such gap, so as to reduce the flow of air into and/or exiting from such gap, and reduce air flow disruptions.

It is customary for Truck operators to balance the weight and to customize the turning radius of each Truck each load carrying trip. This is accomplished in part by moving the Trailer's Bogies forward or backward before or after the Trailer is loaded depending upon the amount of weight in the Trailer, the location of the weight in the Trailer, and the type of road that the Trailer will ride on when carrying such load.

The present invention accommodates the movement of a Trailer's Bogies by expanding and contracting, self adjusting to the changing position of the Bogies. In addition, the mechanism utilized to do this requires a minimum of additional materials, thereby resulting in a very small weight penalty attendant to use of a self-adjusting feature in the fairing structure.

It is common for Trailers operating in higher latitude climates to experience snow and ice build-up on their undersides during inclement winter weather.

The present invention minimizes snow and ice build-up through the properties of the materials from which it is constructed and through the design of its components. These features in turn synergistically confer both operational and aerodynamic advantages, as further described herein.

It is common for Trailers to hit or roll over small obstructions such as curbs, roadside barriers, snow banks and other objects. As a result, any aerodynamic fairings on the sides of Trailers between the surface of the road and the bottom of the Trailer most be (i) sufficiently narrow to provide adequate clearance, and (ii) able to withstand occasional contact with such obstructions.

The present invention incorporates impact amelioration sections which can withstand normal operator errors resulting in occasional contact with roadway obstructions.

Further, the present invention, due in part to the features described above, can be constructed of light weight, interchangeable panels that are readily attached or removed, as by the operator in the field, with no advance training and with use of common tools, if a portion of the invention is damaged.

When a Trailer is not attached to a tractor, its front end is supported by "legs" which retract when the Trailer is attached to a tractor ("Landing Gear"). Further, when Trailers are not attached to a tractor it is common for them to be parked parallel to each other with very narrow spacing Trailer to Trailer to maximize the number of Trailers parked in a given area. As a result, access to the Trailer's Landing Gear (which must be retracted when the Trailer is attached to a tractor to be pulled) is limited. Therefore, any aerodynamic device along the sides of a Trailer must either be located rearward of the Trailer's Landing Gear or be designed to grant access to the Landing Gear in very tight spaces.

The present invention incorporates an access door to the Landing Gear requiring reduced clearance to open/close.

It is common for Trailers to be loaded onto railroad cars and transported long distances by train. This operation is called "Intermodal Operations." During Intermodal Operations a Trailer is physically lifted by a lifting machine and carried from a ground loading area to the applicable railcar and then lowered onto the railcar. Industry standard lifting machines insert "fingers" under the Trailer box in a designated area on each side of the rear of the Trailer and also in a designated area on each side of the front of the Trailer.

The present invention facilitates Intermodal Operations by virtue of its design, which features a portion of the fairing that can be moved in a sliding manner away from the areas utilized by the lifting machines. When so configured, the present invention presents no obstruction to interfere with the operation of industry standard Intermodal Operation lifting machines.

The features yielding these functions, and the beneficial cooperation between the features of the present invention, are described further below.

BRIEF DESCRIPTION OF THE DRAWINGS

FIGS. 2A-2F is a grouping of six drawings depicting various details of the vehicle side fairing comprising the present invention, and in particular those components which permit the fairing to expand/contract as the Bogies are moved forward/rearward.

DETAILED DESCRIPTION OF THE PREFERRED EMBODIMENTS

Figure 1:
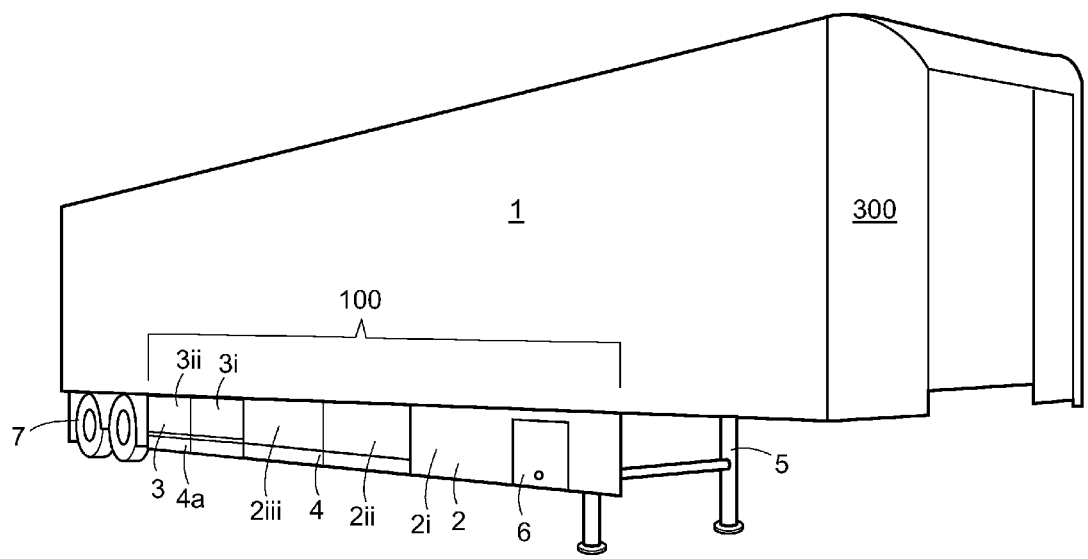
FIG. 1 is a schematic perspective view of a Trailer with the vehicle side fairing comprising the present invention depicted thereon.

FIG. 1 generally depicts a Trailer 1 with the side fairing invention 100 described herein. It is also shown depicted with a front gap closing fairing 300, as more fully described in U.S. patent application Ser. No. 11/684,097.

FIG. 1 depicts the Trailer's Bogies 7 set in their rear-most position, proximate to the rear of the Trailer. As is conventional and as described above, a Trailer's Bogies can be positioned fore and aft to accommodate variations in payload weight and distribution in the van box of Trailer 1 and to shorten the turning radius of the Truck when necessary. FIG. 1 also depicts Landing Gear 5 of Trailer 1, which permits a Trailer to sit level and to allow elevation of the Trailer so that a tractor (not shown) can be attached to and detached from a Trailer.

Figure 7:
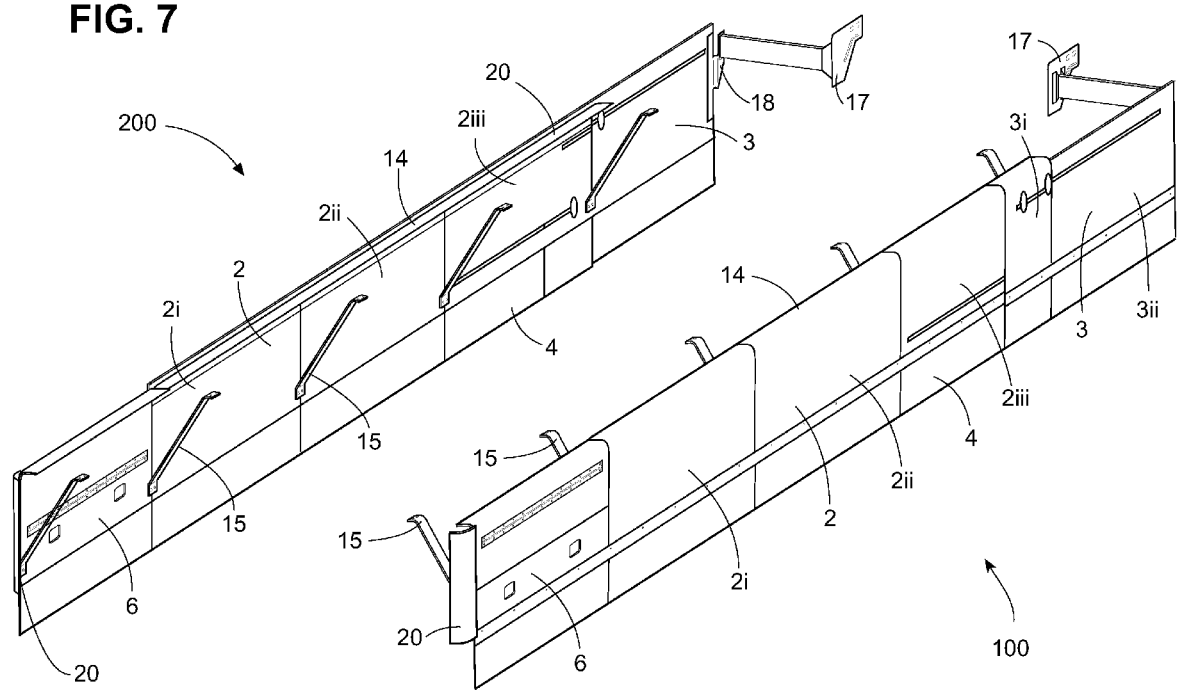
FIG. 7 is an overview drawing of the present invention depicting certain of the elements described in detail below.

Fairing assembly 100 is shown in FIG. 1 on the right side of the trailer depicted. It should be understood that there is a comparable fairing assembly 200 (not shown in FIG. 1) on the left side of the Trailer 1. The purpose of assemblies 100 and 200 is to inhibit the flow of air into and/or exiting from the space between the bottom of the Trailer 1, reduce air flow disruptions underneath Trailer 1, and thereby reduce aerodynamic drag, all as described above. Fairing assemblies 100 and 200 are both shown in FIG. 7.

Fairing assembly 100 is generally comprised of two principal panels, forward fairing panel 2 and rear fairing panel 3. As can be seen in FIG. 1, the Trailer 1 when placed on a road surface defines a spatial gap forward of the Bogies 7 between the bottom of the trailer and the road surface. In general, front fairing panel 2 is secured to the trailer box at a fixed position proximate to such gap, such as in the gap itself, whereas rear fairing panel 3, which is generally parallel to front fairing panel 2, is movable in a sliding manner as described further below.

More specifically, these panels 2 and 3 are generally rectangular planar structures extending in the vertical direction downward to a relatively small distance above the road surface. In one embodiment, approximately 8 inches of clearance is left between the bottoms of panels 2, 3 and the road.

Panels 2 and 3 are secured to the bottom of the box of Trailer 1 approximately equidistant and distal from the longitudinal centerline of the Trailer 1, for example at approximately the periphery of the bottom of the box of Trailer 1. More specifically, the panels 2 and 3 are preferably secured to generally maintain an approximately continuous planar surface with the sides of Trailer 1 (although not perfectly continuous). Alternatively, panels 2 and 3 can be tapered inwardly toward the front of Trailer 1, such that the forward portion of panel 2 is located inboard of the tractor's tires, and angle back (for example, at approximately 20°) toward the Bogies 7, with the rear portion of panel 3 being located approximately at the periphery of the bottom of the box of Trailer 1.

It is preferred that the panels 2 and 3 be made of two or more sections or segments fastened together in a manner that permits the operator to readily disassemble and remove segments when in service. This aspect of the invention advantageously permits the operator to remove damaged segments, without the need for a service call or other outside assistance. Thus FIG. 1 depicts front fairing panel 2 as made up of three segments 2*i*, 2*ii* and 2*iii*, and rear fairing panel 3 as made up of two segments 3*i* and 3*ii*.

The segments in general are sized to permit relatively easy handling by a single operator. The segments are bolted or otherwise fastened together to permit operator disassembly, for example, by overlapping the sheets and installing nut-bolt sets spaced along the overlapping section, or other fasteners which are removable, and optionally fastenable, by hand or with use of hand tools. Alternatively, rivets or other more permanent fastening methods can be used, or even a one-piece panel can be used, in the event field disassembly as described above is not desired.

Forward fairing panel 2 is fixedly secured to the undercarriage structure of the Trailer 1, in a manner described below. Rear fairing panel 3 is movably secured to the Bogies 7 and forward fairing panel 2, as described further below, such that rear fairing panel 3 moves fore and aft as the Bogies 7 move fore and aft.

When the Bogies 7 are in their rear most position, the front edge of rear fairing panel 3 is near the rear edge of front fairing panel 2, and overlaps said front fairing panel 2. As the Trailer's Bogies are positioned further forward, the front portion of rear fairing panel 3 comes to further overlap the rear portion of front fairing panel 2, with rear fairing panel 3 preferably overlapping the outside of front panel 2 (viewed from the perspective of an observer standing at the side of the trailer), in order to permit panel 3 to slide relative to panel 2 when utilizing the support mechanism shown in FIGS. 3A and 3B, and described further below. However, a feature of the present invention is that such overlap may be on the inside of panel 2 if desired, in the event a different support mechanism is used.

At the front of front panel 2 is an access door 6 that permits the operator to gain access to the Landing Gear 5. As depicted in FIG. 3, this access door is a bi-fold design which minimizes the clearance required to open the door and access the Landing Gear. Achieving minimal clearance of the access door for the Landing Gear is a preferred feature of the present invention. While the preferred embodiment of such feature is the bi-fold door depicted in FIG. 3, such function may be achieved via other means, including (without limitation) one or more vertically arranged hinges, or a sliding rather than hinged door assembly.

Forward fairing panel 2 and rear fairing panel 3 include a bottom impact amelioration sections 4 and 4A secured to their lower edge. The width (measured vertically) of sections 4 and 4A can be increased or decreased as desired. As shown, the width of sections 4 and 4A is approximately 10 inches. Section 4 extends from the back of forward fairing panel 2 along the lower edge of fairing panel 2 forward to a desired position—the forward ending position of section 4 may be as far forward as the forward end of panel 2, or positioned back from the forward end of panel 2 at any point desired.

Likewise, rear fairing panel 3 includes a bottom impact amelioration section 4A secured to its lower edge. Section 4A can be of like width as section 4, and preferably extends along the entire length of panel 3.

The purpose of sections 4 and 4A is to reduce or eliminate damage to fairing panels 2 and 3 that may inadvertently occur if the operator backs down sharply inclined loading docks, or cuts turns too close to raised curbs, or the like. Sections 4 and 4A can be made of a crushable material, such as lightweight honeycomb. Alternatively, sections 4 and 4A can be constructed of a vertically oriented flexible bristle material or any other elastic material which returns to its original position after minor impact. The panels are removably mounted with bolts or the like to permit easy replacement.

As explained above, rear fairing panel 3 is movably secured to the Trailer so that it can move forward/rearward as the Bogies move. FIGS. 2A-2F depict an embodiment for providing this functionality. In particular, there is shown the rear fairing panel 3, which can be moved in a sliding manner, the fixed front fairing panel 2, and the mechanisms for securing the moving rear panel to the fixed front panel which permit the panel's movement, comprising elements enumerated as 9 through 12.

Moving rear panel 3 is attached to fixed front panel 2 via "buttons/slides" 12 which are inserted through slots 9 and 10 in moving rear panel 3 and fixed front panel 2. In particular, as shown in FIG. 2A, rear fairing panel 3 has a longitudinal slot 9 in its upper portion, and a button 12 in its lower portion, and as shown in FIG. 2B, forward fairing panel 2 has two buttons 12 in its upper portion and a slot 10 in its lower portion. Upon assembly, buttons 12 pass through slot 9, and button 11 passes through slot 10 to achieve a sliding relationship between panels 2 and 3. It is preferred that the length (in the direction of movement) of rear fairing panel 3 be such that, when slid away from the Bogies 7 to panel 3's forward-most position, access is provided to the lift points of the Trailer by Intermodal Operations lifting machines.

The particulars of buttons 12, and the means by which they are secured to panels 2 and 3, are shown in FIGS. 2C-2F. Specifically, the enlarged, mushroom-like head 120 of button 12 is counter sunk to receive bolt 121, which is secured to panels 2,3 by nut 122, which can be locked in place by means well known in the art, such as by means of a lock washer, a fiber insert in the head of nut 122, or by castellating the head of nut 122 and securing it to bolt 121 using a locking pin passed through a small-diameter appropriately located radially directed through-hole in nut 121. In the case of front fairing panel 2, shown in FIGS. 2E and 2F, there is a doubler 123 to strengthen panel 2 in the region where buttons 12 are secured. Likewise, washer 124 strengthens panel 3 in the region where its button 12 is secured, as shown in FIG. 2D. Buttons 12 can be made of Durlon®, HDPE or other suitable material.

The panels 2 and 3 can be fabricated from sheet steel, aluminum, plastic, or other panel material, and fastened to a structural frame of steel, aluminum, plastic or other angle stock material to enhance rigidity. However, it is preferred that the present invention naturally tend to shed water and minimize snow/ice build-up during inclement winter conditions. These functions are achieved through the selection of the materials comprising the panels 2 and 3 and the support structures for such panels (depicted in FIG. 4).

Accordingly, a preferred embodiment of panels 2 and 3 is constructed of or coated with a material that has a low affinity for material adherence, such as being made from or coated with polypropylene materials. Such materials possess a slick or "oily" surface that naturally repels water. Further, use of such materials minimizes snow and/or ice build-up, since the natural vibration during normal road operations of the Trailer induces any snow or ice that may accumulate on the surface of the panels to break free.

The ability of the present invention to shed snow and ice confers a number of benefits. From an operational standpoint, snow and/or ice build-up causes the weight of the Trailer to increase, which could result in the Trailer exceeding applicable regulatory weight limits. Further, movement of the Trailer's Bogies is typically accomplished by the operator locking the Trailer's brakes, and then moving the tractor, which causes the box of Trailer 1 to shift backward or forward, relative to the Bogies. In the case of such movement, particularly backward movement, any ice or snow build-up could result in damage to the fairing assembly 100, especially in the area where forward fairing panel 2 overlaps rear fairing panel 3. Likewise, operator actions to remove snow and ice build-up (such as to enable frozen rear fairing panel 3 to be freed up and moved) are likely to utilize mechanical aids, which could damage the fairing, and/or require sturdier (and heavier) materials. From an aerodynamic standpoint, the build-up of snow and ice, particularly on the exterior portions of fairing assembly 100, can disrupt the aerodynamics of the fairing assembly, and thereby lessen the fuel savings that assembly 100 are intended to confer. The avoidance of these deleterious conditions is achieved by constructing panels 2 and 3 of a material that has a low affinity for material adherence, as described above.

Figure 3A:
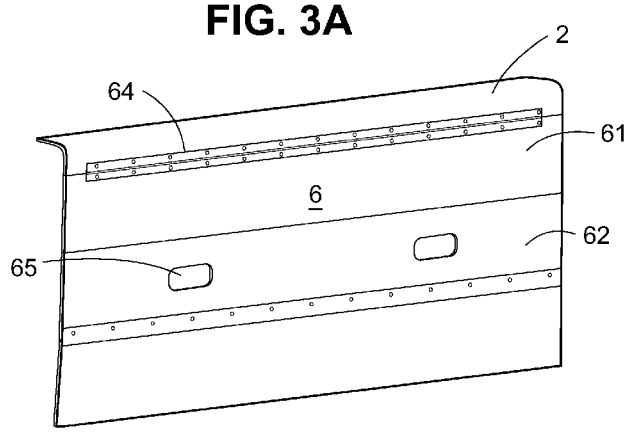
FIGS. 3A and 3B depict the preferred embodiment of the access door to the Landing Gear, achieving the functions described above.
Figure 3B:
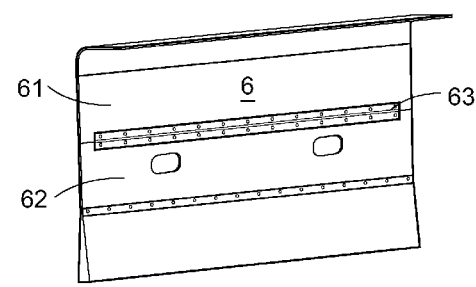
Figure 4A:
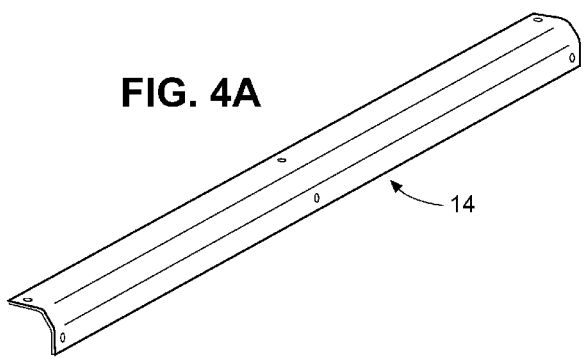
FIGS. 4A-4D is a grouping of four drawings depicting the preferred embodiment of the support and structural members of the present invention.
Figure 4B:
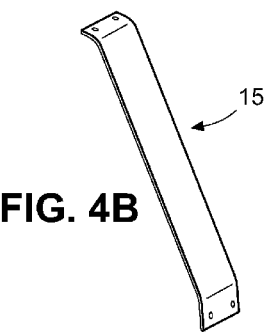
Figure 4C:
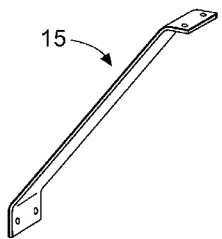
Figure 4D:
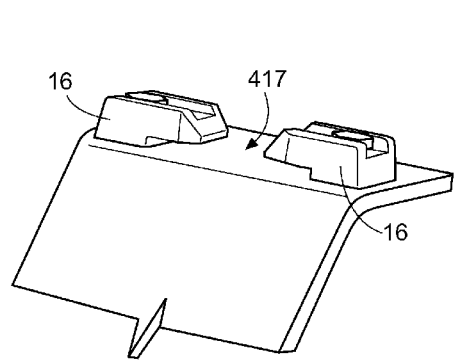

FIGS. 3A and 3B depict a preferred embodiment of the Landing Gear access door 6; FIG. 3A depicts door 6 from the outside of the Trailer and FIG. 3B depicts door 6 from the inside of the Trailer. In this embodiment, the door is fabricated of two panels 61, 62 with a horizontal hinge 63, such as a piano hinge as shown, thereby achieving the small clearance requirement of the present invention. Door 6 is secured over a correspondingly sized aperture in front fairing panel 2 with a second horizontal hinge 64, shown again as a piano hinge. As noted above, Trailers are parked tight to one another, hence any access opening cover for the Landing Gear must feature a small horizontal clearance for operation. Panels 61, 62 are sized to yield a clearance of approximately 12 inches or less when opened or closed. Hand holes 65 permit a person to readily open door 6.

FIGS. 4A-4D depict preferred embodiments of structural support and attachment mechanisms of the present invention. Support 14 comprises an L-section that attaches to the top inside of components 2i, 2ii and 2iii (depicted in FIGS. 1 and 7) of front fairing panel 2. Support structure 14 in turn is bolted to the Trailer's under-carriage support structures. Support 14 can be made of aluminum, or optionally, made or coated with a material that has a low affinity for material adherence, such as being made from or coated with polypropylene material.

The lower portions of front fairing panel 2 are supported by struts 15. Specifically, for each strut 15 there is provided a pair of clamps 16, each of which is bolted to the strut 15, as shown in the close-up view of FIG. 4D. Clamps 16 are positioned on an end of strut 15 in an opposing relationship, and are configured to define a slot 417 for receiving the flange of one of a number of I-beams (not shown) typically mounted transversely to the underside of the Trailer. The struts 15 are securely clamped to the I-beams, and thus to the Trailer. Struts 15 are in turn bolted to the lower portion of front fairing panel 2. In the preferred embodiment, struts 15 are not utilized to support rear fairing panel 3, in order to permit it to slide forward. Struts 15 are preferably constructed of or coated with a material that has a low affinity for material adherence, such as being made from or coated with polypropylene material.

Figure 5A:
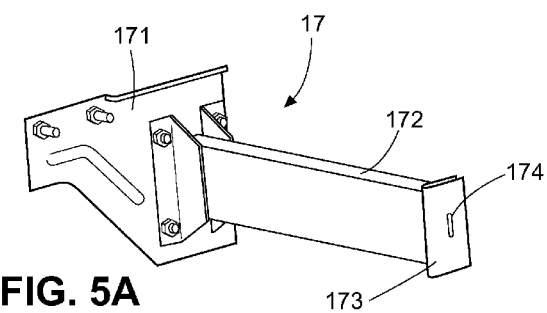
FIGS. 5A-5D is a grouping of four drawings depicting the preferred embodiment of the structures that move the moving portion of the present invention when the Bogies are moved, and secure such portions of the invention.
Figure 5B:
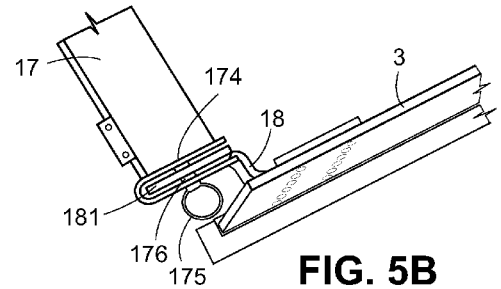
Figure 5C:
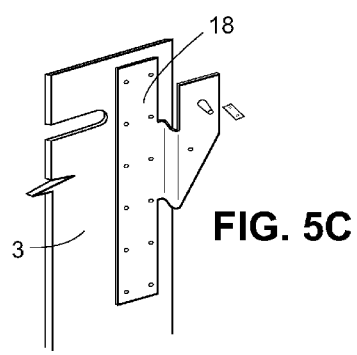

FIGS. 5A-5C depict a preferred embodiment of the present invention showing the attachment mechanisms and structures connecting moving rear panel 3 to the Bogies. Component 17 comprises a plate 171 that is secured to the Bogie, as by using bolts, and an arm 172 fastened to plate 171 and terminating in a flange 173. Flange 173 is a plate section bent 180° around a radius to form a slot, and further has an orifice 174 in each portion of the bent-over plate section for receiving a fastener 175.

FIG. 5B depicts a mating mechanism 18 that is secured to rear fairing panel 3. Mating mechanism 18 comprises a plate section bolted to rear fairing panel 3, as depicted in FIGS. 5B and 5C. Further, mating mechanism 18 has a tang 181 that is in a receiving relationship with the slot in flange 173 when panel 3 is slid rearwardly. Also, mating mechanism 18 has an orifice 176 that aligns with orifice 174. Accordingly, when fastener 175 is inserted through orifices 174, 176, component 17 is joined to moving rear panel 3. The result is that movement of the Bogies drives rear panel 3 forward/rearward correspondingly.

Figure 5D:
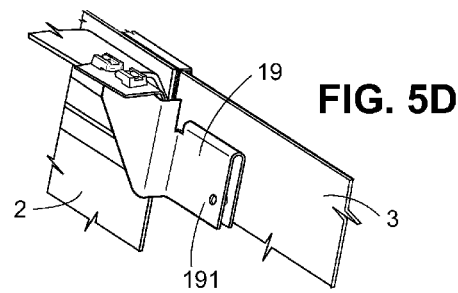

FIG. 5D depicts an example of a locking mechanism on the rear of front panel 2 which permits the locking of rear panel 3 in its forward-most position to permit Intermodal Operations. Specifically, a receiving bracket 19 comprises a plate section bent 180° around a radius to form a slot, and further has an orifice 191 in each portion of the bent-over plate section for receiving fastener 175 when rear fairing panel 3 is slid to its forward-most position. Thus for Intermodal Operations, the operator releases fastener 175 from component 17, slides rear fairing panel forward, and then secures fastener 175 to receiving bracket 19. Fastener 175 can be a quarter-turn fastener or the like, for ease of use.

Figure 6:
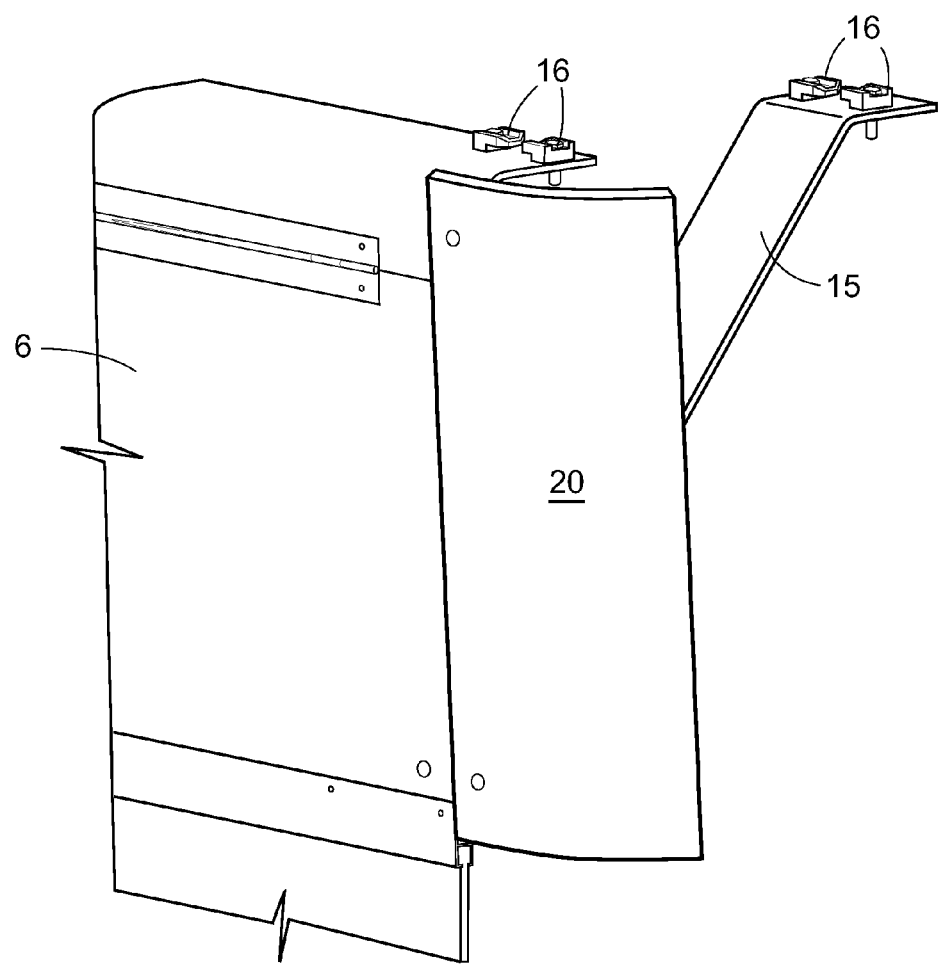
FIG. 6 is drawing depicting the preferred embodiment of the front section of the present invention, and also depicts support and attachment mechanisms.

FIG. 6 depicts an air deflecting panel 20 attached to the front edge of front panel 2. Such element directs air from behind the wheels of a Truck's tractor and airflow at the front of panel 100 to the exterior of the panel and away from the area under the Trailer. An identical element is attached to the front of panel 200, except that its shape is the inverse of the shape of item 20.

It should be understood that the present invention is advantageously utilized in conjunction with the front fairing 12 depicted in FIG. 1, and more fully disclosed in U.S. patent application Ser. No. 11/684,097, and with the rear fairing structure disclosed in U.S. Pat. No. 6,799,791.

What is claimed is:
1. A side fairing system, comprising:
a trailer having a trailer box and a fore and aft positionally adjustable wheel set, the trailer when placed on a road surface defining a spatial gap forward of the wheel set between the bottom of the trailer and the road surface;
a first fairing panel secured to the trailer box at a fixed position proximate to said spatial gap and including a bi-fold access door;
a second fairing panel fore and aft slidably mounted to the first fairing panel and including an impact amelioration section secured to the lower edge of the second fairing panel;
at least one of the first fairing panel and the second fairing panel being made of a material having a low affinity for material adherence, and the second fairing panel being releasably secured to the wheel set so that the second fairing panel can be moved with an adjustment of the position of the wheel set.

\* \* \* \* \*